US012657492B2

(12) United States Patent
Heikell

(10) Patent No.: US 12,657,492 B2
(45) Date of Patent: *Jun. 16, 2026

(54) SYSTEMS, METHODS AND APPARATUS FOR EVALUATING STATUS OF COMPUTING DEVICE USER

(71) Applicant: Nobots LLC, Renton, WA (US)

(72) Inventor: Timothy P. Heikell, Renton, WA (US)

(73) Assignee: Nobots LLC, Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,298

(22) Filed: Oct. 17, 2023

(65) Prior Publication Data

US 2024/0119324 A1 Apr. 11, 2024

Related U.S. Application Data

(60) Continuation of application No. 17/874,137, filed on Jul. 26, 2022, now Pat. No. 11,836,647, which is a (Continued)

(51) Int. Cl.
*G06N 7/01* (2023.01)
*G06F 21/31* (2013.01)
*G06F 21/50* (2013.01)

(52) U.S. Cl.
CPC ............. *G06N 7/01* (2023.01); *G06F 21/316* (2013.01); *G06F 21/50* (2013.01); *G06F 2221/2133* (2013.01)

(58) Field of Classification Search
CPC ....... G06N 7/005; G06F 21/316; G06F 21/50; G06F 2221/2133

(Continued)

(56) References Cited

U.S. PATENT DOCUMENTS

| | | |
|---|---|---|
| 5,375,244 A | 12/1994 | McNair |
| 5,933,498 A | 8/1999 | Schneck et al. |

(Continued)

FOREIGN PATENT DOCUMENTS

| | | |
|---|---|---|
| JP | 2007213409 A | 8/2007 |
| WO | WO2007090605 A1 | 8/2007 |

OTHER PUBLICATIONS

*Nobots LLC* v *Google LLC*, "Google's Preliminary Invalidity and Subject-Matter Ineligibility Contentions, Exhibit B-3", Case No. 6:21-cv-1290-ADA, In the United States District Court for the Western District of Texas Waco Division, Ex. B-3—885 Claim Chart for O'Sullivan I, pp. 1-219.

(Continued)

*Primary Examiner* — Jacob Lipman
(74) *Attorney, Agent, or Firm* — Sea Koempel-Thomas; K-T Legal, PLLC

(57) ABSTRACT

Methods, systems and apparatus for assessing a likely status of an operator of a computing device interacting with a server as a human operator or an autonomic computer application, such as a "bot" are described herein. By monitoring at least some data, e.g., biometric data, generated at the client computing device, a comparison can be made between the monitored data and model data relating to human interaction with the computing device. The results of the comparison can lead to a value that represents the likelihood that the monitored data results from human interaction.

44 Claims, 4 Drawing Sheets

Related U.S. Application Data continuation of application No. 16/578,823, filed on Sep. 23, 2019, now Pat. No. 11,775,853, which is a division of application No. 15/457,099, filed on Mar. 13, 2017, now Pat. No. 10,423,885, which is a continuation of application No. 12/313,502, filed on Nov. 19, 2008, now Pat. No. 9,595,008.

(60) Provisional application No. 61/003,743, filed on Nov. 19, 2007.

(58) Field of Classification Search
USPC .......................................................... 706/52
See application file for complete search history.

(56) References Cited

U.S. PATENT DOCUMENTS

| | | | |
|---|---|---|---|
| 6,195,698 | B1 | 2/2001 | Lillibridge et al. |
| 6,405,922 | B1 | 6/2002 | Kroll |
| 6,460,141 | B1 | 10/2002 | Olden |
| 7,089,241 | B1 | 8/2006 | Alspector et al. |
| 7,373,524 | B2 | 5/2008 | Motsinger et al. |
| 7,506,170 | B2 | 3/2009 | Finnegan |
| 7,516,220 | B1 | 4/2009 | Stiert |
| 7,606,915 | B1 | 10/2009 | Calinov et al. |
| 7,657,849 | B2 | 2/2010 | Chaudhri et al. |
| 7,680,891 | B1 | 3/2010 | Pongsajapan |
| 7,721,107 | B2 | 5/2010 | Golle et al. |
| 7,785,180 | B1 | 8/2010 | Von Ahn et al. |
| 7,877,707 | B2 | 1/2011 | Westerman et al. |
| 7,895,653 | B2 | 2/2011 | Calo et al. |
| 7,917,491 | B1 | 3/2011 | Sack |
| 7,917,508 | B1 | 3/2011 | Baluja et al. |
| 7,945,952 | B1* | 5/2011 | Behforooz .............. H04L 63/08 726/21 |
| 7,980,953 | B2 | 7/2011 | von Ahn Arellano |
| 8,032,483 | B1 | 10/2011 | Haveliwala et al. |
| 8,056,129 | B2 | 11/2011 | Guslerll et al. |
| 8,214,891 | B2 | 7/2012 | Seacat |
| 8,280,993 | B2 | 10/2012 | Awadallah et al. |
| 8,353,764 | B2 | 1/2013 | Williams et al. |
| 8,413,250 | B1 | 4/2013 | Krynski |
| 8,510,795 | B1 | 8/2013 | Gargi |
| 8,601,538 | B2 | 12/2013 | Qvarfordt et al. |
| 8,682,718 | B2 | 3/2014 | Zwicky |
| 8,684,839 | B2 | 4/2014 | Mattice et al. |
| 8,694,244 | B2 | 4/2014 | Schalk |
| 8,700,259 | B2 | 4/2014 | Schalk |
| 8,706,405 | B2 | 4/2014 | Schalk |
| 8,713,657 | B2 | 4/2014 | Lee |
| 8,738,287 | B2 | 5/2014 | Schalk |
| 8,775,235 | B2 | 7/2014 | Hedley et al. |
| 8,775,236 | B2 | 7/2014 | Hedley et al. |
| 8,793,135 | B2 | 7/2014 | Lewis et al. |
| 8,824,659 | B2 | 9/2014 | Bushey et al. |
| 8,825,379 | B2 | 9/2014 | Schalk |
| 8,838,570 | B1 | 9/2014 | English |
| 8,903,052 | B2 | 12/2014 | Moore et al. |
| 8,938,395 | B2 | 1/2015 | Willner et al. |
| 9,047,458 | B2 | 6/2015 | Etchegoyen |
| 9,088,652 | B2 | 7/2015 | Bushey et al. |
| 9,152,381 | B2 | 10/2015 | Valentino et al. |
| 9,208,461 | B2 | 12/2015 | Busa |
| 9,240,078 | B2 | 1/2016 | Hedley et al. |
| 2005/0008148 | A1 | 1/2005 | Jacobson |
| 2005/0015257 | A1 | 1/2005 | Bronstein |
| 2005/0066201 | A1 | 3/2005 | Goodman et al. |
| 2005/0114705 | A1 | 5/2005 | Reshef et al. |
| 2005/0144067 | A1* | 6/2005 | Farahat .................. G06Q 30/02 705/14.66 |
| 2005/0198158 | A1 | 9/2005 | Fabre et al. |
| 2005/0278253 | A1 | 12/2005 | Meek et al. |
| 2006/0015390 | A1 | 1/2006 | Rijsinghani et al. |
| 2006/0136294 | A1 | 6/2006 | Linden et al. |
| 2006/0253580 | A1* | 11/2006 | Dixon ................. H04L 63/0227 709/225 |
| 2007/0016689 | A1 | 1/2007 | Birch |
| 2007/0018393 | A1 | 1/2007 | Ritter et al. |
| 2007/0038568 | A1 | 2/2007 | Greene |
| 2007/0106737 | A1 | 5/2007 | Barnes et al. |
| 2007/0165911 | A1 | 7/2007 | Baentsch et al. |
| 2007/0192419 | A1 | 8/2007 | Vuong et al. |
| 2007/0192849 | A1 | 8/2007 | Golle et al. |
| 2007/0201745 | A1 | 8/2007 | Wang et al. |
| 2007/0239604 | A1* | 10/2007 | O'Connell .............. G06F 21/55 705/50 |
| 2007/0240230 | A1 | 10/2007 | O'Connell et al. |
| 2007/0250920 | A1* | 10/2007 | Lindsay .................. G06F 21/31 726/7 |
| 2007/0255818 | A1 | 11/2007 | Tanzer et al. |
| 2007/0255821 | A1 | 11/2007 | Ge et al. |
| 2007/0259716 | A1 | 11/2007 | Mattice et al. |
| 2007/0300077 | A1 | 12/2007 | Mani et al. |
| 2008/0040653 | A1 | 2/2008 | Levine |
| 2008/0049969 | A1 | 2/2008 | Koziol |
| 2008/0066014 | A1 | 3/2008 | Misra |
| 2008/0086524 | A1* | 4/2008 | Afergan .................. H04L 67/02 709/202 |
| 2008/0091453 | A1 | 4/2008 | Meehan et al. |
| 2008/0114624 | A1 | 5/2008 | Kitts |
| 2008/0127302 | A1 | 5/2008 | Qvarfordt et al. |
| 2008/0147456 | A1 | 6/2008 | Broder et al. |
| 2008/0162200 | A1 | 7/2008 | O'Sullivan et al. |
| 2008/0162227 | A1 | 7/2008 | Jakobsson et al. |
| 2008/0225870 | A1 | 9/2008 | Sundstrom |
| 2008/0263636 | A1* | 10/2008 | Gusler ................ H04L 63/1466 726/4 |
| 2008/0281606 | A1 | 11/2008 | Kitts et al. |
| 2008/0288303 | A1 | 11/2008 | Gray et al. |
| 2008/0319774 | A1 | 12/2008 | O'Sullivan et al. |
| 2009/0024971 | A1 | 1/2009 | Willner et al. |
| 2009/0044264 | A1 | 2/2009 | Ramanathan et al. |
| 2009/0055193 | A1 | 2/2009 | Maislos et al. |
| 2009/0094311 | A1 | 4/2009 | Awadallah et al. |
| 2009/0113294 | A1 | 4/2009 | Sanghavi et al. |
| 2009/0150986 | A1 | 6/2009 | Foreman |
| 2009/0197815 | A1 | 8/2009 | Vincenzi et al. |
| 2009/0241174 | A1 | 9/2009 | Rajan et al. |
| 2009/0249477 | A1 | 10/2009 | Punera |
| 2009/0307028 | A1 | 12/2009 | Eldon et al. |
| 2009/0320123 | A1 | 12/2009 | Yu et al. |
| 2010/0037147 | A1 | 2/2010 | Champion et al. |
| 2010/0070620 | A1 | 3/2010 | Awadallah et al. |
| 2010/0211997 | A1* | 8/2010 | McGeehan ........... H04L 63/107 726/4 |
| 2011/0029902 | A1 | 2/2011 | Bailey |
| 2011/0113388 | A1 | 5/2011 | Eisen et al. |
| 2013/0019290 | A1 | 1/2013 | Lee |
| 2015/0112892 | A1 | 4/2015 | Kaminsky |

OTHER PUBLICATIONS

*Nobots LLC* v *Google LLC*, "Google's Preliminary Invalidity and Subject-Matter Ineligibility Contentions, Exhibit B-4 885", Case No. 6:21-cv-1290-ADA, In the United States District Court for the Western District of Texas Waco Division, Ex. B-4—885 Claim Chart for Meek, pp. 1-157.

*Nobots LLC* v *Google LLC*, "Google's Preliminary Invalidity and Subject-Matter Ineligibility Contentions, Exhibit B-5-885", Case No. 6:21-cv-1290-ADA, In the United States District Court for the Western District of Texas Waco Division, Ex. B-5—885 Claim Chart for Tanzer, pp. 1-163.

*Nobots LLC* v *Google LLC*, "Google's Preliminary Invalidity and Subject-Matter Ineligibility Contentions, Exhibit B-6 885", Case No. 6:21-cv-1290-ADA, In the United States District Court for the Western District of Texas Waco Division, Ex. B-6—885 Claim Chart for Kitts I, 150 pgs.

*Nobots LLC* v *Google LLC*, "Google's Preliminary Invalidity and Subject-Matter Ineligibility Contentions, Exhibit B-7 885", Case No. 6:21-cv-1290-ADA, In the United States District Court for the

(56)        References Cited

OTHER PUBLICATIONS

Western District of Texas Waco Division, Ex. B-7—885 Claim Chart for Gusler I, 142 pgs.
*Nobots LLC* v *Google LLC*, "Google's Preliminary Invalidity and Subject-Matter Ineligibility Contentions, Exhibit B-8", Case No. 6:21-cv-1290-ADA, In the United States District Court for the Western District of Texas Waco Division, Ex. B-8—885 Claim Chart with Obviousness Combinations, 239 pgs.
*Nobots LLC* v *Google LLC*, "Subject-Matter Eligibility Contentions, Exhibit C-008", Case No. 6:21-cv-1290-ADA, in the United States District Court for the Western District of Texas Waco Division, Ex. C—008 Claim Chart with Subject-Matter Eligibility Contentions, 61 pgs.
*Nobots LLC* v *Google LLC*, "Subject-Matter Eligibility Contentions, Exhibit D-885", Case No. 6:21-cv-1290-ADA, in the United States District Court for the Western District of Texas Waco Division, Ex. D—885 Claim Chart with Subject-Matter Eligibility Contentions, 53 pgs.
File History for U.S. Appl. No. 10/423,885, filed Mar. 13, 2017, 226 pages.
File History for U.S. Pat. No. 9,595,008 filed Nov. 19, 2008, 137 pages.
"Fingerprint Reader: Replace Passwords with Your Fingerprint" retrieved on the internet on Aug. 16, 2018 at <<https://web.archive.org/web/20061230123302/http://www.microsoft.com/hardware/mouseandkeyboard/productdetails.aspxZpid=036>> 1 page.
Flanagan, David, "JavaScript: The Definitive Guide", vol. 1018, Fifth Edition, O'Reilly Media, Inc., 2006, 1023 pgs.
Yeung, et al., "Detecting Cheaters for Multiplayer Games: Theory, Design and Implementation", IEEE CCNC 2006 Proceedings, Jan. 8-10, 2006, pp. 1178-1182.
Gamboa, et al., "A behavioral biometric system based on human-computer interaction", Proc. SPIE 5404, Biometric Technology for Human Identification, vol. 5404, Aug. 25, 2004, pp. 381-392.
Ghosemajumder, Shuman, "Google, Click Fraud and Invalid Clicks", accessed at <<http://shumans.com/articles/000044.php>> on Apr. 6, 2022, 3 pgs.
Golle, Philippe, "Machine Learning Attacks Against the ASIRRA CAPTCHA", Proceedings of the 15th ACM Conference on Computer and Communications Security, Palo Alto Research Center, 2008, 9 pgs.
Golle & Ducheneaut, "Preventing Bots From Playing Online Games", ACM Computers in Entertainment, Palo Alto Research Center, vol. 3, No. 3, Article 3C, Jul. 2005, 10 pgs.
Good Prior Art Stipulation dated Apr. 29, 2022, 2 pages.
Gossweiler, et al., "What's up CAPTCHA? A CAPTCHA Based on Image Orientation", Proceedings of the 18th International Conference on World Wide Web, 2009, 10 pgs.
Immorlica, et al., "Click Fraud Resistant Methods for Learning Click-Through Rates" In International Workshop on Internet and Network Economics, Microsoft Research, Redmond, WA, 13 pgs.
Initial Related Complaint from United States District Court, Western District of Texas, Waco Division, Case No. 6:21-cn1290, dated Dec. 20, 2021, 39 pages.
Ives, Nat, "Web Marketers Fearful of Fraud in Pay-Per-Click", The New York Times, 2005, 3 pgs.
Jain, et al., "Biometrics: Personal Identification in Networked Society", Kluwer Academic Publishers, 1999, Part 1, 100 pgs.
Jain, et al., "Biometrics: Personal Identification in Networked Society", Kluwer Academic Publishers, 1999, Part 2, 100 pgs.
Jain, et al., "Biometrics: Personal Identification in Networked Society", Kluwer Academic Publishers, 1999, Part 3, 100 pgs.
Jain, et al., "Biometrics: Personal Identification in Networked Society", Kluwer Academic Publishers, 1999, Part 4, 111 pgs.
Jain, et al., "Handbook of Biometrics" Springer Science & Business Media, 2008, Part 1, 138 pgs.
Jain, et al., "Handbook of Biometrics" Springer Science & Business Media, 2008, Part 2, 138 pgs.
Jain, et al., "Handbook of Biometrics" Springer Science & Business Media, 2008,, Part 3, 74 pgs.
Jain, et al., "Handbook of Biometrics" Springer Science & Business Media, 2008, Part 4, 100 pgs.
Jain, et al., "Handbook of Biometrics" Springer Science & Business Media, 2008, Part 5, 100 pgs.
Jakobsson & Ramzan, "Crimeware: Understanding New Attacks and Defenses", Addison-Wesley Professional, 2008, Part 1, 120 pgs.
Jakobsson & Ramzan, "Crimeware: Understanding New Attacks and Defenses", Addison-Wesley Professional, 2008, Part 2, 120 pgs.
Jakobsson & Ramzan, "Crimeware: Understanding New Attacks and Defenses", Addison-Wesley Professional, 2008, Part 3, 120 pgs.
Jakobsson & Ramzan, "Crimeware: Understanding New Attacks and Defenses", Addison-Wesley Professional, 2008, Part 4, 120 pgs.
Jakobsson & Ramzan, "Crimeware: Understanding New Attacks and Defenses", Addison-Wesley Professional, 2008, Part 5, 117 pgs.
Koch, Peter-Paul, "PPK on JavaScript", New Riders, 2007, 530 pgs.
Kochanski, et al., "A Reverse Turing Test using speech", Proceedings of the Seventh International Conference on Spoken Language Processing, Denver, Colorado, USA, Sep. 16-20, 2002, pp. 1357-1360.
Larsen & Marx, "An Introduction to Mathematical Statistics and its Applications," Fourth Edition, Pearson Prentice Hall, 2018, Part 1, 120 pgs.
Larsen & Marx, "An Introduction to Mathematical Statistics and its Applications," Fourth Edition, Pearson Prentice Hall, 2018, Part 2, 120 pgs.
Larsen & Marx, "An Introduction to Mathematical Statistics and its Applications," Fourth Edition, Pearson Prentice Hall, 2018, Part 3, 120 pgs.
Larsen & Marx, "An Introduction to Mathematical Statistics and its Applications," Fourth Edition, Pearson Prentice Hall, 2018, Part 4, 120 pgs.
Larsen & Marx, "An Introduction to Mathematical Statistics and its Applications," Fourth Edition, Pearson Prentice Hall, 2018, Part 5, 120 pgs.
Larsen & Marx, "An Introduction to Mathematical Statistics and its Applications," Fourth Edition, Pearson Prentice Hall, 2018, Part 6, 120 pgs.
Larsen & Marx, "An Introduction to Mathematical Statistics and its Applications," Fourth Edition, Pearson Prentice Hall, 2018, Part 7, 120 pgs.
Larsen & Marx, "An Introduction to Mathematical Statistics and its Applications," Fourth Edition, Pearson Prentice Hall, 2018, Part 8, 90 pgs.
Lopresti, "Leveraging the CAPTCHA Problem", International Workshop on Human Interactive Proofs, Springer, Berlin, Heidelberg, May 2005, 26 pgs.
Declaration of Daniel P. Lopresti, Ph.D. for U.S. Pat. No. 9,595,008, dated Apr. 29, 2022, 120 pages.
Declaration of Daniel P. Lopresti, Ph.D. for U.S. Pat. No. 10,423,885, dated Apr. 29, 2022, 119 pages.
Mann, "How click fraud could swallow the internet", Wired Magazine 14, No. 1, Jan. 1, 2006, 4 pgs.
Ahn, et al., "CAPTCHA: Using Hard AI Problems for Security", Lecture Notes in Computer Science, vol. LNCS 2656, 2003, pp. 294-331.
Ahn, et al., "Human computation" Synthesis lectures on artificial intelligence and machine learning, vol. 5, No. 3, Jun. 2011, pp. 1-121.
Ahn, et al., "Labeling Images with a Computer Game", Association for Computing Machinery, New York, Apr. 24-29, 2004, pp. 319-326.
Ahn, et al., "reCAPTCHA: Human-Based Character Recognition via Web Security Measures", Science 321, No. 5895, Sep. 12, 2008, pp. 1465-1468.
Ahn, et al., "Telling Humans and Computers Apart (Automatically)", retrieved on Mar. 28, 2022, <<https://web.archive.or /web/20070104074513/htt ://www.ca tcha.net:80/>>, Carnegie Mellon, 2004.
Al-Qayed, et al., "Secure Centralised Mobile and Web-based control system Using GPRS with J2ME", ICECS2003 Sharjah U.A.E 2003, 5 pgs.

(56)            References Cited

OTHER PUBLICATIONS

Al-Qayedi, et al., "Combined Web/Mobile Authentication for Secure Web Access Control", WCNC 2004, IEEE Communications Society, 2004, 5 pages.

Andersen, et al., "Using alert levels to enhance keystroke dynamic authentication", Nov. 19-21, 2007, 9 pgs.

Athanasopoulos, et al., "Enhanced CAPTCHAs: Using animation to tell humans and computers apart" in IFIP International Conference on Communications and Multimedia Security, Springer, Berlin, Heidelberg, CMS 2006, LNCS 4237, Oct. 2006, pp. 97-108.

Baird & Lopresti, Human Interactive Proofs: Second International Workshop, HIP 2005, Bethlehem, PA, USA, Proceedings, vol. 3517, May 19-20, 2005, Springer.

Baird, et al., "ScatterType: A Legible but Hard-to-Segment CAPTCHA," Eighth International Conference on Document Analysis and Recognition (ICDAR'05). IEEE, Korea, 2005, 6 pgs.

Baird, et al., "BaffleText: a human interactive proof," Proc. SPIE 5010, Document Recognition and Retrieval X, vol. 5010, (Jan. 13, 2003) pp. 305-316.

Baird, et al., "Implicit captchas" In IS&T/SPIE Document Recognition and Retrieval XII, vol. 5676, Jan. 16-20, 2006, pp. 191-196.

Baker, "Click Fraud and How to Stop It", retrieved on Dec. 7, 2004 at <<https://www.searchenginejournal.com/click-fraud-and-how-to-stop-it/1123/#closee>>, SearchEngine Journal.

Bannan, "Click Fraud Is Growing on the Web", Nov. 2, 2022, at <<https://www.nytimes.com/2006/09/23/technology/23click.html>>, The New York Times, Sep. 23, 2006.

Barras, "Robot Asimo can understand three voices at once", retrieved on Nov. 2, 2022, <<https://www.newscientist.com/article/dn14105-robot-asimo-can-understand-three-voices-at-once/#:~:text=Advanced%20humanoid%20robot%20Asimo%20just,out%20their%20choices%20at%20once>>, NewScientist, Jun. 10, 2008.

Botbarrier, "Turn any digital image into a clickable CAPTCHA!", Captured Mar. 22, 2008 and Retrieved Online Nov. 16, 2022 from the Internet Archive Wayback Machine at <<<https://web.archive.org/web/20080621051833/htp://ww.botbarrier.com:80/, BotBarrier>>>.

BotBarrier; "How effective is BotBarrier?" Captured by the Internet Archive Wayback Machine on Mar. 22, 2008 and Retrieved on Nov. 16, 2022 at <<<https://web.archive.org/web/20080322231602/http://www.botbarrier.com:80/faq.html>>>.

Chen et al., "Game bot detection based on avatar trajectory", International Conference on Entertainment Computing, Springer, Berlin, Heidelberg, 2008, pp. 94-105.

Chen, et al., "Identifying MMORPG bots: A traffic analysis approach" Proceedings of the 2006 ACM SIGCHI international conference on Advances in computer entertainment technology, Jun. 2006, pp. 1-13.

Chew, et al., "Image Recognition CAPTCHAs" In Zhang, K., Zheng, Y. (eds) Information Security, ISC 2004, Lecture Notes in Computer Science, vol. 3225, Springer, Berlin, Heidelberg, 2004, 19 pgs.

Chow, et al., "Making CAPTCHAs clickable", Proceedings of the 9th workshop on Mobile computing systems and applications, 2008, pp. 91-94.

Chu, et al., "A Hybrid Training Mechanism for Applying Neural Networks to Web-based Applications," 2004 IEEE International Conference on Systems, Man and Cybernetics (IEEE Cat. No. 04CH37583), vol. 4, IEEE, 2004, pp. 3543-3545.

Click Tracking Software—TrafficSentry.com, "Click Hawk Click Fraud Detection Software", captured Jan. 27, 2022 on The Wayback Machine, retrieved online Nov. 18, 2022 from <<<https://web.archive.org/web/20220127223730/http://www.clickhawk.com/>>>.

Coates, "Pessimal Print: A Reverse Turing Test", IJDAR 5, 2003, pp. 158-163.

Codeen: "A Content Distribution Network for PlanetLab", Apr. 27, 2022, <<https://web.archive.org/web/20070210195838/https://codeen.cs.princeton.edu;80>>, PlanetLab.

Daniel Lopresti CV, dated Apr. 2022, 56 pages.

Datta, et al., "Imagination: a robust image-based CAPTCHA generation system" In Proceedings of the 13th annual ACM international conference on Multimedia, 2005, pp. 331-334.

"Do you advertise on any of the pay-per-click networks or search engines?", retrieved on Apr. 29, 2022, <<https://web.archive.org/web/20070116074721/http:I /clickhawk.com:80/faq.htm>>, Traffic Sentry, 2007.

RPX Insight, "Dossier: Human Differential Intelligence, LLC", RPX Corporation, Aug. 7, 2020, pp. 1-24.

Edwards, et al., "The JavaScript Anthology: 101 Essential Tips, Tricks & Hacks.", Sitepoint, 2006, Part 1, pp. 1-170.

Edwards, et al., "The JavaScript Anthology: 101 Essential Tips, Tricks & Hacks.", Sitepoint, 2006, Part 2, pp. 171-271.

Edwards, et al., "The JavaScript Anthology: 101 Essential Tips, Tricks & Hacks.", Sitepoint, 2006, Part 3, pp. 272-372.

Edwards, et al., "The JavaScript Anthology: 101 Essential Tips, Tricks & Hacks.", Sitepoint, 2006, Part 4, pp. 373-500.

Edwards, et al., "The JavaScript Anthology: 101 Essential Tips, Tricks & Hacks.", Sitepoint, 2006, Part 5, pp. 501-626.

Elson, et al.,. "Asirra: A Captcha that exploits interest-aligned manual image categorization", CCS 7, Oct 29-Nov. 2, 2007 pp. 366-374.

*Nobots LLC* v *Google LLC*, "Google's Preliminary Invalidity and Subject-Matter Ineligibility Contentions, Exhibit A-1", Case No. 6:21-cv-1290-ADA, In the United States District Court for the Western District of Texas Waco Division, Ex. A-1—008 Claim Chart for Willner, pp. 1-152.

*Nobots LLC* v *Google LLC*, "Google's Preliminary Invalidity and Subject-Matter Ineligibility Contentions, Exhibit A-10", Case No. 6:21-cv-1290-ADA, In the United States District Court for the Western District of Texas Waco Division, Ex. A-10—008 Claim Chart for Tanzer, pp. 1-211.

*Nobots LLC* v *Google LLC*, "Google's Preliminary Invalidity and Subject-Matter Ineligibility Contentions, Exhibit A-11-008", Case No. 6:21-cv-1290-ADA, In the United States District Court for the Western District of Texas Waco Division, Ex. A-11—008 Claim Chart for Eldon I, pp. 1-155.

*Nobots LLC* v *Google LLC*, "Google's Preliminary Invalidity and Subject-Matter Ineligibility Contentions, Exhibit A-12-008", Case No. 6:21-cv-1290-ADA, In the United States District Court for the Western District of Texas Waco Division, Ex. A-12—008 Claim Chart with Obviousness Combinations, pp. 1-590.

*Nobots LLC* v *Google LLC*, "Google's Preliminary Invalidity and Subject-Matter Ineligibility Contentions, Exhibit A-2-008", Case No. 6:21-cv-1290-ADA, In the United States District Court for the Western District of Texas Waco Division, Ex. A-2—008 Claim Chart for Ge, pp. 1-171.

*Nobots LLC* v *Google LLC*, "Google's Preliminary Invalidity and Subject-Matter Ineligibility Contentions, Exhibit A-3-008", Case No. 6:21-cv-1290-ADA, In the United States District Court for the Western District of Texas Waco Division, Ex. A-3—008 Claim Chart for O'Sullivan I, pp. 1-207.

*Nobots LLC* v *Google LLC*, "Google's Preliminary Invalidity and Subject-Matter Ineligibility Contentions, Exhibit A-4 008", Case No. 6:21-cv-1290-ADA, In the United States District Court for the Western District of Texas Waco Division, Ex. A-4—008 Claim Chart for O'Connell I, pp. 1-154.

*Nobots LLC* v *Google LLC*, "Google's Preliminary Invalidity and Subject-Matter Ineligibility Contentions, Exhibit A-5 008", Case No. 6:21-cv-1290-ADA, In the United States District Court for the Western District of Texas Waco Division, Ex. A-5—008 Claim Chart for Krynski, pp. 1-178.

*Nobots LLC* v *Google LLC*, "Google's Preliminary Invalidity and Subject-Matter Ineligibility Contentions, Exhibit A-6 008", Case No. 6:21-cv-1290-ADA, In the United States District Court for the Western District of Texas Waco Division, Ex. A-6—008 Claim Chart for Farahat, pp. 1-144.

*Nobots LLC* v *Google LLC*, "Google's Preliminary Invalidity and Subject-Matter Ineligibility Contentions, Exhibit A-7", Case No. 6:21-cv-1290-ADA, In the United States District Court for the Western District of Texas Waco Division, Ex. A-7—008 Claim Chart for Awadallah I, pp. 1-189.

(56)　　　　　References Cited

OTHER PUBLICATIONS

*Nobots LLC* v *Google LLC*, "Google's Preliminary Invalidity and Subject-Matter Ineligibility Contentions, Exhibit A-8 008", Case No. 6:21-cv-1290-ADA, In the United States District Court for the Western District of Texas Waco Division, Ex. A-8—008 Claim Chart for Kitts I, pp. 1-139.
*Nobots LLC* v *Google LLC*, "Google's Preliminary Invalidity and Subject-Matter Ineligibility Contentions, Exhibit A-9 008", Case No. 6:21-cv-1290-ADA, In the United States District Court for the Western District of Texas Waco Division, Ex. A-9—008 Claim Chart for Meek, pp. 1-143.
*Nobots LLC* v *Google LLC*, "Google's Preliminary Invalidity and Subject-Matter Ineligibility Contentions, Exhibit B-1—885", Case No. 6:21-cv-1290-ADA, In the United States District Court for the Western District of Texas Waco Division, Ex. B-1—885 Claim Chart for Willner I, pp. 1-140.
*Nobots LLC* v *Google LLC*, "Google's Preliminary Invalidity and Subject-Matter Ineligibility Contentions, Exhibit B-2 885", Case No. 6:21-cv-1290-ADA, In the United States District Court for the Western District of Texas Waco Division, Ex. B-2—885 Claim Chart for Ge, pp. 1-144.
Saygin, et al., "Turing Test: 50 Years Later", Minds and Machines, vol. 10, 2000, pp. 463-518.
Shirali-Shahreza, et al., "CAPTCHA for Blind People", 2007 IEEE International Symposium on Signal Processing and Information Technology, pp. 995-998, 2007.
Hirali-Shahreza et al., "CAPTCHA for Children", 2008 IEEE International Conference on System of Systems Engineering, Jun. 2-4, 2008, pp. 1-6.
Shirali-Shahreza, et al., "CAPTCHA for Children," 2008 IEEE International Conference on System of Systems Engineering, IEEE, 2008, 7 pgs.
Shirali-Shahrezaet, et al., "Bibliography of works done on CAPTCHA", 2008 3rd International Conference on Intelligent System and Knowledge Engineering, vol. 1, 2008, pp. 205-210.
Silva, et al., "Ka-CAPTCHA: An Opportunity for Knowledge Acquisition on the Web", in AAAI, 2007, pp. 1322-1327.
Sion, et al., "On-the-fly intrusion detection for web portals" In Proceedings ITCC 2003. International Conference on Information Technology: Coding and Computing, IEEE, Apr. 28-30, 2003, pp. 325-330.
Sylvain, et al., "Users Authentication by a study of human computer interactions", Universite Fran, ois-Rabelais, Tours-France, May 18, 2004, 6 pgs.
Tam, et al., "Breaking Audio CAPTCHAs", Advances in Neural Information Processing Systems 21, Dec. 8, 2008, pp. 1-8.
Tan, et al., "Discovery of Web Robot Sessions Based on their Navigtional Patterns", Intelligent Technologies for Information Analysis, Springer-Verlang, Berlin, Heidelberg, 2004, 30 pgs.
Temple et al., "Testability Modeling and Analysis of a Rocket Engine Test Stand", IEEE Aerospace Conference, Jan. 2005, pp. 3874-3895.
Thau, "The Book of JavaScript, 2nd Edition: A Practical Guide to Interactive Web Pages", No Starch Press, 2006, Part 1, 120 pgs.
Thau, "The Book of JavaScript, 2nd Edition: A Practical Guide to Interactive Web Pages", No Starch Press, 2006, Part 2, 120 pgs.
Thau, "The Book of JavaScript, 2nd Edition: A Practical Guide to Interactive Web Pages", No Starch Press, 2006, Part 3, 120 pgs.
Thau, "The Book of JavaScript, 2nd Edition: A Practical Guide to Interactive Web Pages", No Starch Press, 2006, Part 4, 169 pgs.
Thompson, "For Certain Tasks, the Cortex Still Beats the CPU", retrieved on Jan. 18, 2022, Wired, Jun. 25, 2007, 11 pgs.
"Tired of passwords? Replace them with your fingerprint", Microsoft Corporations; retrieved from the internet on Aug. 16, 2018 at <<https://web.archive.org/web/20040926002804/http://www.microsoft.com:80hardware;mouseandkeyboard/features/fingerprint.mspx>>, 1 page.
Tuzhilin, "The lane's gifts v. google report", Official Google Blog: Findings on invalid clicks, posted 2006, 47 pgs.
Vincent, "JavaScript Developer's Dictionary", Sams, United Kingdom, 2002, Part 1, pp. 1-120.
Vincent, "JavaScript Developer's Dictionary", Sams, United Kingdom, 2002, Part 10, pp. 1081-1175.
Vincent, "JavaScript Developer's Dictionary", Sams, United Kingdom, 2002, Part 2, pp. 121-240.
Vincent, "JavaScript Developer's Dictionary", Sams, United Kingdom, 2002, Part 3, pp. 241-360.
Vincent, "JavaScript Developer's Dictionary", Sams, United Kingdom, 2002, Part 4, pp. 361-480.
Vincent, "JavaScript Developer's Dictionary", Sams, United Kingdom, 2002, Part 5, pp. 481-600.
Vincent, "JavaScript Developer's Dictionary", Sams, United Kingdom, 2002, Part 6, pp. 601-1-720.
Vincent, "JavaScript Developer's Dictionary", Sams, United Kingdom, 2002, Part 7, pp. 721-840.
Vincent, "JavaScript Developer's Dictionary", Sams, United Kingdom, 2002, Part 8, pp. 841-960.
Vincent, "JavaScript Developer's Dictionary", Sams, United Kingdom, 2002, Part 9, pp. 961-1080.
Von Ahn, et al., "Telling Humans and Computers Apart (Automatically) or How Lazy Cryptographers Do AI," Computer Science Department, Carnegie Mellon University, 2002, 11 pgs.
Walker, "In Game of Click and Mouse, Advertisers Come Up Empty", retrieved on Nov. 2, 2022, <<https://www.netmagellan.com/in-game-of-click-and-mouse-advertisers-come-up-empty-279.html>>, Net Mahellan, Mar. 16, 2006, 2 pgs.
Yampolskiy, et al., "Embedded Noninteractive Continuous Bot Detection", ACM Computers in Entertainment, vol. 5, No. 4, Article 7, Mar. 2008, 11 pgs.
Yan, "Bot, Cyborg and Automated Turing Test" International Workshop on Security Protocols, Lecture Notes in Computer Science, vol. 5087, Springer, Berlin, Heidelberg, Jun. 2006, pp. 190-197 (Abstract).
Yan, Jeff, "Bot, Cyborg and Automated Turing Test: (Or Putting the Humanoid in the Protocol)," Security Protocols: 14th International Workshop, Cambridge, UK, 2006, Revised Selected Papers 14, Springer, 2009, 15 pgs.
Zakas, "Professional JavaScript for Web Developers" Wiley Publishing, Inc., 2009, Part 1, pp. 1-120.
Zakas, "Professional JavaScript for Web Developers" Wiley Publishing, Inc., 2009, Part 2, pp. 121-240.
Zakas, "Professional JavaScript for Web Developers" Wiley Publishing, Inc., 2009, Part 3, pp. 241-360.
Zakas, "Professional JavaScript for Web Developers" Wiley Publishing, Inc., 2009, Part 4 pp. 361-480.
Zakas, "Professional JavaScript for Web Developers" Wiley Publishing, Inc., 2009, Part 5, pp. 481-660.
Zakas, "Professional JavaScript for Web Developers" Wiley Publishing, Inc., 2009, Part 6, pp. 601-660.
May, Matt, "Escape from CAPTCHA" accessed on Mar. 28, 2022, at << https://www.w3.org/2004/Talks/0319-csun-m3m/>>, 25 pgs.
May, "Inaccessibility of CAPTCHA", Alternatives to Visual Turing Tests on the Web, W3C Working Group Note, Retrieved Online on Apr. 18, 2022, from the Internet Archive Wayback Machine, 2005, 7 pgs.
McCausland et al.,"A Proactive Risk-Awar Robitic Sensor Network for Critical Infrastructure Protection", IEEE International Conference on Computational Intelligence and Virtual Environments for Measurement Systems and Applications (CIVEMSA), Apr. 2013, pp. 132-137.
McConnell, Steve, "Code Complete 2nd Edition", Microsoft Press, Publishing House of Electronics Industry, Jan. 1, 2004, Part 1, 120 pgs.
McConnell, Steve, "Code Complete 2nd Edition", Microsoft Press, Publishing House of Electronics Industry, Jan. 1, 2004, Part 10, 74 pgs.
McConnell, Steve, "Code Complete 2nd Edition", Microsoft Press, Publishing House of Electronics Industry, Jan. 1, 2004, Part 2, 80 pgs.
McConnell, Steve, "Code Complete 2nd Edition", Microsoft Press, Publishing House of Electronics Industry, Jan. 1, 2004, Part 3, 100 pgs.

(56) References Cited

OTHER PUBLICATIONS

McConnell, Steve, "Code Complete 2nd Edition", Microsoft Press, Publishing House of Electronics Industry, Jan. 1, 2004, Part 4, 100 pgs.

McConnell, Steve, "Code Complete 2nd Edition", Microsoft Press, Publishing House of Electronics Industry, Jan. 1, 2004, Part 5, 100 pgs.

McConnell, Steve, "Code Complete 2nd Edition", Microsoft Press, Publishing House of Electronics Industry, Jan. 1, 2004, Part 6, 100 pgs.

McConnell, Steve, "Code Complete 2nd Edition", Microsoft Press, Publishing House of Electronics Industry, Jan. 1, 2004, Part 8, 100 pgs.

McConnell, Steve, "Code Complete 2nd Edition", Microsoft Press, Publishing House of Electronics Industry, Jan. 1, 2004, Part 9, 100 pgs.

Microsoft Corporation, Online Video for "Introducing Microsoft Fingerprint Reader," Captured Jan. 11, 2005, on The Internet Archive Wayback Machine at <<<https://web.archive.org/web/2005011104104/http://www.microsoft.com/hardware/mouseandkeyboard/features/docs/>>>, 1 pg.

"Microsoft Fingerprint Reader" retrieved from the internet on Aug. 16, 2018 at << https//en.wikipedia.org/wikiMicrosoft_Fingerprint_Reader>>, 2 pages.

Moncur, Michael, "Sams Teach Yourself JavaScript in 24 Hours", Third Edition, Sams Publishing, Switzerland, 2002, Part 1, 100 pgs.

Moncur, Michael, "Sams Teach Yourself JavaScript in 24 Hours", Third Edition, Sams Publishing, Switzerland, 2002, Part 2, 100 pgs.

Moncur, Michael, "Sams Teach Yourself JavaScript in 24 Hours", Third Edition, Sams Publishing, Switzerland, 2002, Part 3, 120 pgs.

Moncur, Michael, "Sams Teach Yourself JavaScript in 24 Hours", Third Edition, Sams Publishing, Switzerland, 2002, Part 4, 125 pgs.

"Most people have at least 15 username and password combinations to remember" retrieved from the internet on Aug. 16, 2018 at <<https://web.archive.org/web/20050111041404/http://www.microsoft.com:80/hardware/mouseandkeyboard/features/docs/fingerprint.html >>, 12 pgs.

*Nobots LLC* v *Google LLC*, "Google's Preliminary Invalidity and Subject-Matter Ineligibility Contentions", Case No. 6:21-cv-1290-ADA, In the United States District Court for the Western District of Texas Waco Division, pp. 1-111.

Office Action for U.S. Appl. No. 16/578,823, mailed on Oct. 27, 2022, Heikell, "Systems, Methods and Apparatus for Evaluating Status of Computing Device User", 9 pgs.

Office Action for U.S. Appl. No. 17/874,137, mailed on Oct. 28, 2022, Heikell, "Systems, Methods and Apparatus for Evaluating Status of Computing Device User", 12 pages.

Office Action for U.S. Appl. No. 17/882,082, mailed on Oct. 28, 2022, Heikell, "Systems, Methods and Apparatus for Evaluating Status of Computing Device User", 12 pages.

Office Action for U.S. Appl. No. 16/578,823, mailed on Apr. 5, 2022, Heikell, "Systems, Methods and Apparatus for Evaluating Status of Computing Device User", 10 pages.

Office action for U.S. Appl. No. 12/313,502, mailed on Sep. 16, 2011, Heikell, "Systems, Methods and Apparatus for Evaluating Status of Computing Device User", 9 pages.

Office Action for U.S. Appl. No. 15/457,099, mailed on Sep. 25, 2018, Heikell, "Systems, Methods and Apparatus for Evaluating Status of Computing Device User", 16 pages.

Oli, "The Cutest Human-Test: KittenAuth", retrieved on Nov. 2, 2022, <<https://thepcspy.com/read/the-cutest-humantest-kittenauth/>>, Apr. 6, 2006.

Pal et al., "Trust Assessment from Observed Behavior: Toward and Essential Service for Trusted Network Computing", Fifth IEEE International Symposium on Network Computing and Applications (NCA'06), Jul. 2006, pp. 285-292.

Park, et al., "Securing Web Service by Automatic Robot Detection" in USENIX Annual Technical Conference, General Track, 2006, pp. 255-260.

Penenberg, "BlowSearch Tackles Click Fraud", at <<http://www.wired.com/2005/06/blowsearch-tackles-click-fraud/>>, Wired, Jun. 18, 2005.

Piccardi, Massimo, "Background subtraction techniques: a review", 2004 IEEE International Conference on Systems, Man and Cybernetics, 2004, pp. 3099-3104.

Pilgrim, "Greasemonkey Hacks: Tips & Tools for Remixing the Web with Firefox" O'Reilly Media, Inc., 2005, 498 pgs.

Powell, et al., "JavaScript: The Complete Reference", McGraw-Hill/Osborne, Inc, 2004, Part 1, pp. 1-120.

Powell, et al., "JavaScript: The Complete Reference", McGraw-Hill/Osborne, Inc, 2004, Part 2, pp. 121-240.

Powell, et al., "JavaScript: The Complete Reference", McGraw-Hill/Osborne, Inc, 2004, Part 3, pp. 241-360.

Powell, et al., "JavaScript: The Complete Reference", McGraw-Hill/Osborne, Inc, 2004, Part 4, pp. 361-480.

Powell, et al., "JavaScript: The Complete Reference", McGraw-Hill/Osborne, Inc, 2004, Part 5, pp. 481-600.

Powell, et al., "JavaScript: The Complete Reference", McGraw-Hill/Osborne, Inc, 2004, Part 6, pp. 601-720.

Powell, et al., "JavaScript: The Complete Reference", McGraw-Hill/Osborne, Inc, 2004, Part 7, pp. 721-840.

Powell, et al., "JavaScript: The Complete Reference", McGraw-Hill/Osborne, Inc, 2004, Part 8, pp. 841-978.

Prevent PPC Click Fraud—TrafficSentry.com; "Do You Advertise on Any of the Pay-Per Click Networks or Search Engines," captured Apr. 29, 2022 on The Wayback Machine, <<<https://web.archive.org/web/20070118082529/http://clickhawk.com.80/clickhawk/>>>, 14 pgs.

Petition for Inter Partes Review for U.S. Pat. No. 10,423,885 dated Apr. 29, 2022, 94 pages.

Petition for Inter Partes Review for U.S. Pat. No. 9,595,008 dated Apr. 29, 2022, 86 pages.

"ReCAPTCHA: Using Captchas to Digitize Books", retreived on Jan. 18, 2022, <<https://techcrunch.com/2007/09/16/recaptcha-using-captchas-to-digitize-books/>>, TechCrunch, Sep. 16, 2007.

"Researcher Hacks Microsoft Fingerprint Reader" retrieved from the internet on Aug. 16, 2018 at <<https://www.pcworld.com/article/124978/article.html>> 3 pages.

Ross, et al., "Human recognition using biometrics: an overview" In Annales Des Télécommunications, vol. 62, No. 1, Springer-Verlag, Jan. 2007, pp. 11-35.

Rui, et al., "Characters or faces: A User Study on Ease of Use for HIPs" International Workshop on Human Interactive Proofs, Springer, Berlin, Heidelberg, 2005, pp. 53-65.

Rusu, "Exploiting the gap in human and machine abilities in handwriting recognition for web security applications", University of New York at Buffalo, Aug. 2007, 141 pgs.

Rusu, et al., "Visual CAPTCHA with handwritten image analysis", International Workshop on Human Interactive Proofs, Springer, Berlin, Heidelberg, 2005, pp. 42-52.

\* cited by examiner

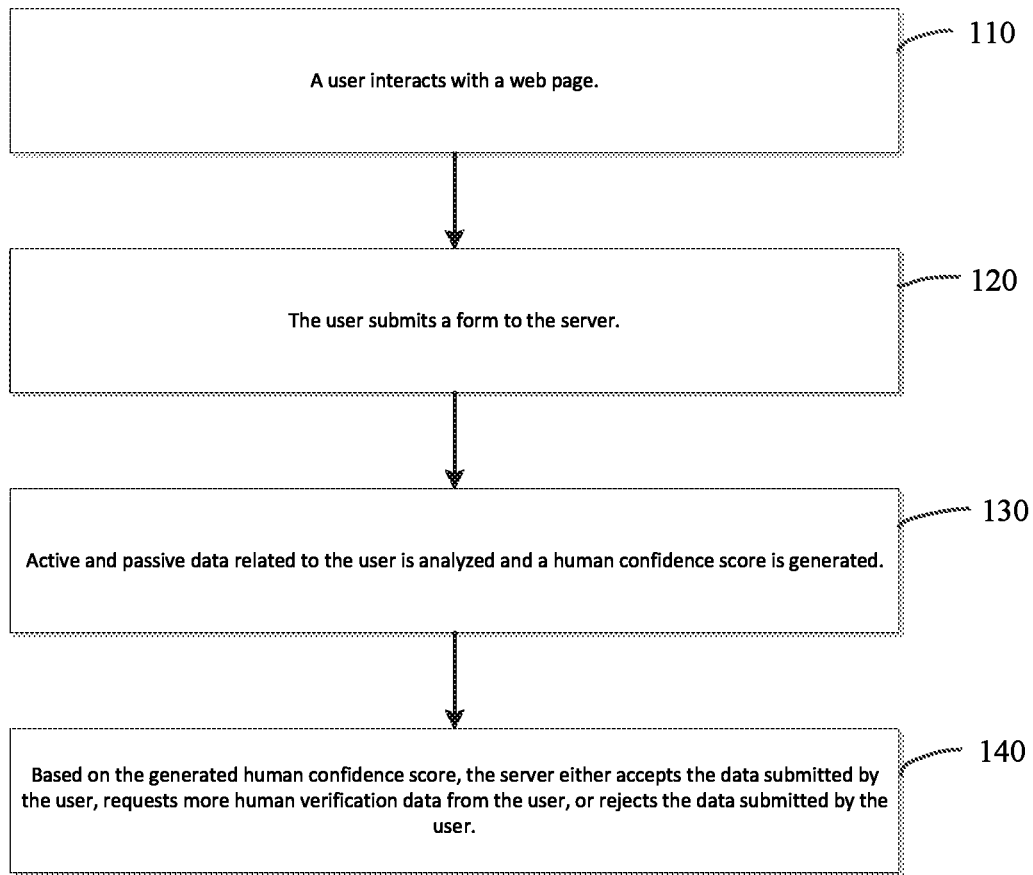

A user interacts with a web page. — 110

The user submits a form to the server. — 120

Active and passive data related to the user is analyzed and a human confidence score is generated. — 130

Based on the generated human confidence score, the server either accepts the data submitted by the user, requests more human verification data from the user, or rejects the data submitted by the user. — 140

Fig 1

SYSTEMS, METHODS AND APPARATUS FOR EVALUATING STATUS OF COMPUTING DEVICE USER

This application is a continuation application of and claims priority to application Ser. No. 17/874,137 filed Jul. 26, 2022, which is a continuation application of application Ser. No. 16/578,823 filed Sep. 23, 2019, which issued as U.S. Pat. No. 11,775,853 on Oct. 3, 2023, which is a divisional application of application Ser. No. 15/457,099 filed Mar. 13, 2017, which issued as U.S. Pat. No. 10,423,885 on Sep. 24, 2019, which claims priority to application Ser. No. 12/313,502 filed Nov. 19, 2008, which issued as U.S. Pat. No. 9,595,008 on Mar. 14, 2017, which claims priority to provisional application Ser. No. 61/003,743 filed Nov. 19, 2007, all of which are incorporated herein by reference.

BACKGROUND

The Internet is a fantastic tool for constructive web sites to gather users for a common purpose; however, the Internet is also a fantastic tool for abuse of these same web sites. People who want to take advantage of websites do so by creating automated programs employing various algorithms and routines (hereinafter "bots") that create fictitious accounts or access content for a multitude of reasons.

In an effort to block these bots, builders of web sites have created a variety of tests to determine if the user is a bot or if the user is a human. Initial efforts required a user to simply enter an alphanumeric string into an input field. However, as character recognition engines became more available, such "tests" became easily defeated. What was needed was a more robust form of test—one that couldn't be easily defeated.

Carnegie Mellon University coined the term "CAPTCHA" (Completely Automated Public Turing test to tell Computers and Humans Apart) for these types of tests. A common type of CAPTCHA requires that the user type the letters, digits or characters of a distorted image appearing on the screen. The objective is to create an image that a bot cannot easily parse but that is discernable by a human. Such efforts have been successful in preventing non-adaptive software from recognizing the imaged characters, but people intent on abusing these sites have designed ways to circumvent the CAPTCHA, such as through specially tuned character recognition programs. A brief survey of the Internet will reveal many resources that describe how to tune and/or use character recognition to decipher CAPTCHA including aiCaptcha, Simon Fraser University and PWNtcha.

The result of the foregoing is that while CAPTCHAs are becoming increasingly more difficult for bots, they are also becoming more difficult and/or burdensome for human users. In certain instances, the desire to defeat the bots has resulted in images that are so distorted that some human users cannot decipher the images. This is particularly true with users having a visual deficiency or imparity. As a partial solution to this escalation of perception difficulty, some web sites have begun adding a link to a sound file that will speak the characters, but these sound files are also being drastically distorted to protect against being discerned by bots through speech pattern matching algorithms. Other web sites like Facebook.com, have gone so far as to adopt a practice requiring deciphering two distorted word images to increase the complexity for bots. While perhaps achieving the stated objective, the collateral effect is to exacerbate the existing burden to human users.

Current CAPTCHA technology is visual or auditory in nature, requiring the human user to answer a test that should be simple to most humans but difficult for non-humans, e.g., bots. Visual CAPTCHA using distorted images is widely used as the primary test by nearly every top Internet site including Yahoo, Google, You Tube, Microsoft's Live ID, MySpace, Facebook, Wikipedia, Craigs List. By using solely visual testing criteria, nearly all users will be able to invoke the requested action; not all users have functioning audio equipment or environments such as libraries may not permit such use.

A positive user experience is critical to the success and increased popularity of a given website. Designers of web sites go to great lengths to ensure their website is as user friendly as possible. Carnegie Mellon University estimates that 60 million CAPTCHA tests are deciphered every day and with an average time spent of 10 seconds, requiring a total of 150,000 hours of work spent every day trying to protect web sites from bots. Reducing or eliminating the requirement of a user having to decipher CAPTCHA is one more way websites can create a more positive user experience for their visitors and minimize opportunity costs.

SUMMARY OF THE INVENTION

The invention is generally directed to methods, systems and apparatus for assessing the likely user status of a computing device interacting with a server where computing device is in bi-directional operative communication with the server wherein the status is one of a human operator or a computer executable program (also referred to herein as a "bot"). This assessment comprises comparing acquired and/or available data relating to the operation of the computing device to suitable models embodying human user derived data (model data). In most embodiments, the comparison yields a probability value as to one of the status states 140, 330, which then may be used by a program or administrator of the server to permit or deny access and/or operation to the computing device. Because many of the invention embodiments provide a probability result as opposed to a binary result, the invention embodiments avoid the "there is only one right answer" phenomena inherent in prior art CAPTCHA tests. In other words, rather than placing the burden of proof on the user for functionality/access, which if the user is a human invokes the negative consequences of conventional CAPTCHA tests as previously described, the burden is shifted to the server side of the equation.

BRIEF DESCRIPTION OF THE DRAWINGS

The detailed description is described with reference to the accompanying figures. The use of the same reference numbers in different figures indicates similar or identical components or features.

FIG. 1 illustrates an overview of the process described in this disclosure.

DETAILED DESCRIPTION

Figure 2:
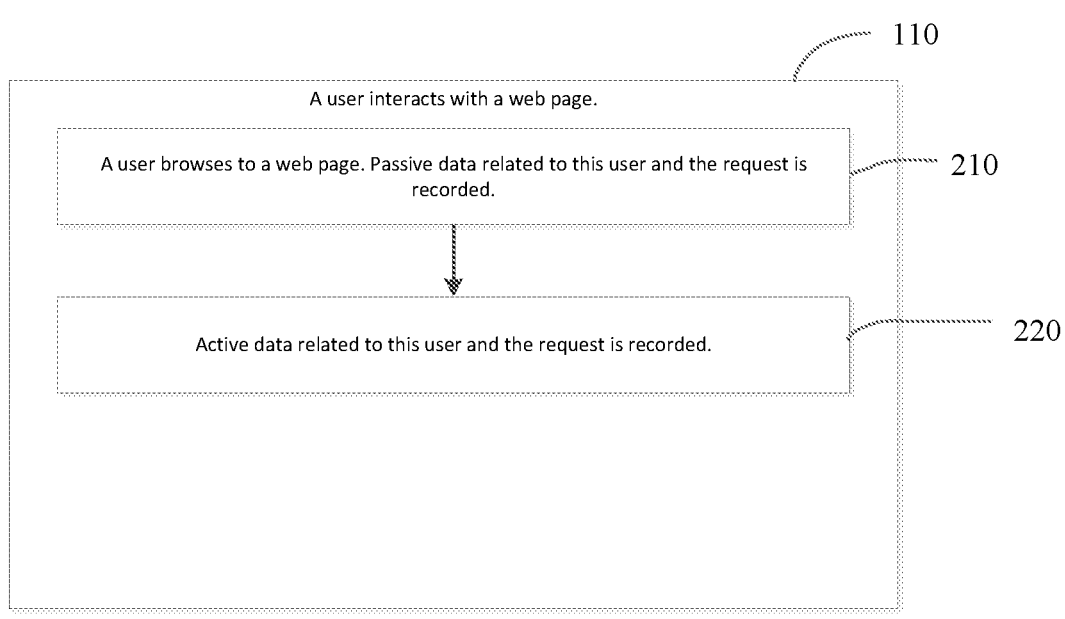
FIG. 2 illustrates in more detail the first step 110 of FIG. 1 (a user interacts with a web page).
Figure 3:
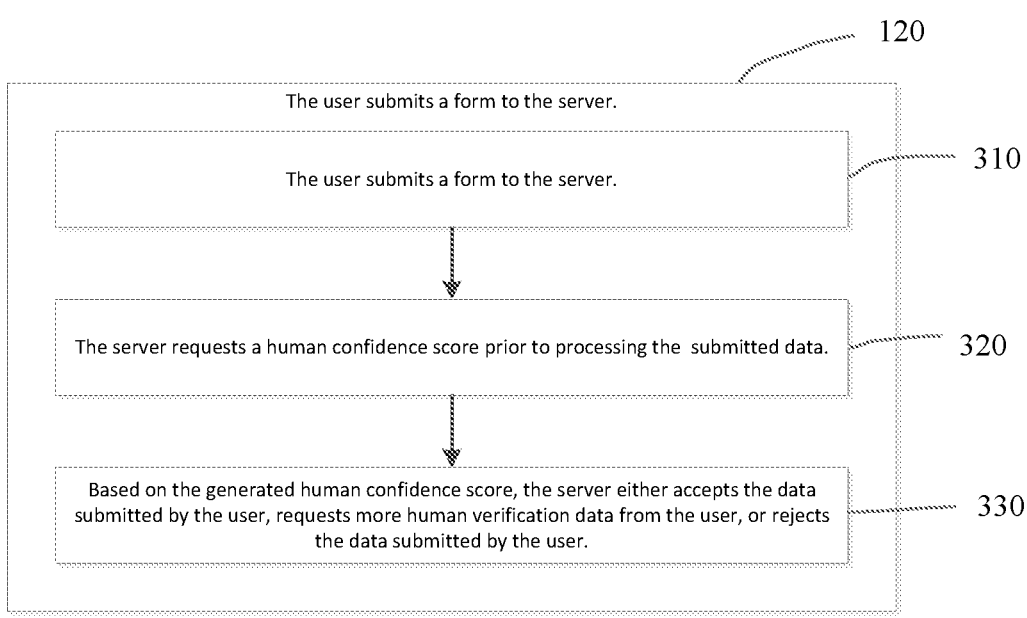
FIG. 3 illustrates in more detail the second step 120 of FIG. 1 (the user submits a form to the server).
Figure 4:
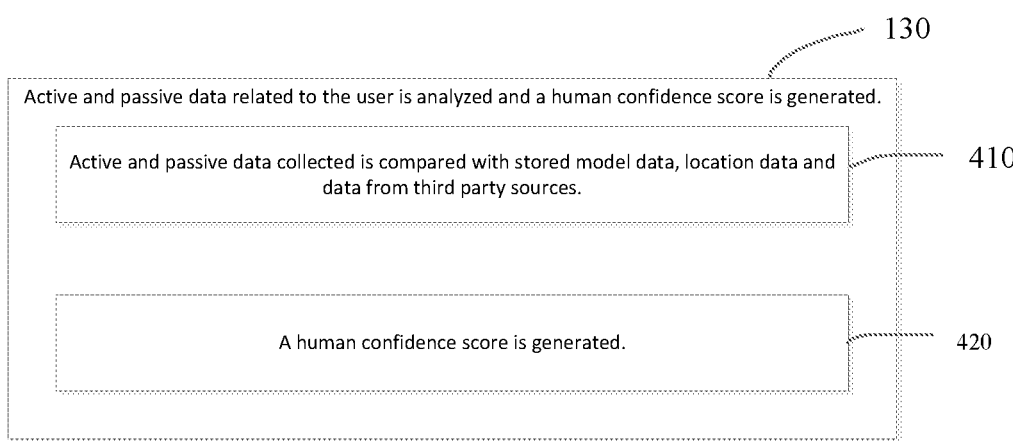
FIG. 4 illustrates in more detail the third step 130 of FIG. 1 (active and passive data related to the user is analyzed and a human confidence score is generated).

As used herein, "model data", its equivalents and verb forms comprises data indicative of human interaction with a computing environment and that can be received by a computing device that is physically remote from the sample computing environment and equivalents. Model data comprises two main categories: active model data 220 and passive model data 210. Active model data comprises data acquired from a computing device user's interactions therewith and within the computing environment where such data is not normally stored (logged) or transmitted to a remote location. Such model data includes, without limitation, pointing device vector movements and/or cadence, key stroke combinations and/or cadence, time differentials between stimulus (e.g., display of dialog box, radio button, form field, etc., and/or generation of sound) and user response (e.g., input into dialog box, selection of radio button, completion of form field, new page display request rates, etc., and/or input response to sound), and similar metrics. Generally, such data must be monitored and stored 210, 220 by a program operative on the computing device, which makes the data available to another program, preferably on a server 320, or actively transmits such data to a server. Passive model data comprises data available from a computing device user's interactions therewith and within the computing environment where such data is normally stored (logged) or transmitted to a remote location. Such model data includes, without limitation, browser cookies, destination IP histories, originating IP address, originating IP address traffic data, originating IP address physical location, third party data regarding abusers (including originating IP addresses and physical locations), etc.

Also as used herein, the term "available data", its equivalents and verb forms comprises data associated with a computing device's operation and its interaction with a computing environment, such as the Internet, that is generally recorded within the computing device and/or by other devices that have been affected by the computing device's operation this is also a type of passive data; the term "acquired data", its equivalents and verb forms comprises data associated with a computing device's operation and its interaction with a computing environment, such as the Internet, that is generally not recorded within the computing device and/or by other devices that have been affected by the computing device's operation, but at least some data of which has/have been recorded and/or transmitted to a remote location, such as a server—this is a type of active data.

In addition to the foregoing, the term "issued data", its equivalents and verb forms comprises data generated by a server or other computing device that is not the same as the computing device for which the assessment as to user status is being performed; "monitored data", its equivalents and verb forms comprises active or passive data, whether available or acquired, obtained from the computing device, or as a result of its external interactions, after the generation of issued data; "interest data", its equivalents and verb forms comprises active or passive data, whether available or acquired, that correlates to any data within model data, whether obtained prior to or after the generation of issued data. Thus, interest data includes time independent available data and acquired data, unless qualified differently.

With the foregoing definitions in mind, operation of the various invention embodiments can be better understood. In a first series of embodiments, a comparison between interest data, acquired prior to delivery of issued data to the client computing device, and model data is performed to ascertain the likely status of the client computing device, i.e., human user or bot 130, 420. In a second series of embodiments, a comparison between monitored data, by definition acquired after delivery of issued data to the client computing device, and model data is performed to ascertain the likely status of the client computing device, i.e., human user or bot 130, 420. In both series of embodiments, acquired and/or available data may be used for comparison with suitable model data. The recited comparisons can take place locally on the computing device, remotely on the originating server, or on a server dedicated to performing such actions and for which subscriptions may be offered in conjunction with methods for providing services according to the methods, apparatus and systems embodiments described herein.

While available data represents data that is readily harvestable by query, for example, from the computing device or the computing environment in which the device operates, acquired data requires some form of information capture means. In the various embodiments described herein, the computing device is caused to monitor and retain certain data useful as acquired data for comparison purposes. Such monitoring and retaining means for acquiring data from the computing device comprises, without limitation, modification of (an) existing program(s) (e.g., such means are included in available browsers), a covert program (e.g., many malware applications log keystrokes and periodically pass them to remote servers for malicious purposes; similar technology can be used to exploit necessary aspects of the invention embodiments), or a servlet/Java applet. If user privacy is a concern, the monitoring and retaining means can remain dormant until activated by, for example, an enabled web site 110.

The monitoring and retaining means may also enable transmission of some or all retained data 410, in encrypted or unencrypted form, as may be desired for privacy and security purposes, and/or merely retain the data until requested from, for example, the server, at which time some or all data may be transmitted 120, 310. As described above with reference to the comparison actions 130, 410, such receiving and/or polling actions can be carried out remotely on the originating server or on a server dedicated to performing such actions, if not performed locally on the computing device.

From the foregoing, it can be seen that implementation of the invention embodiments can be accomplished exclusively from the server side; it is not necessary to distribute or install in the conventional sense client side software. Existing available browsers and operating systems provide the means necessary to temporarily install logging code, if such is elected. Moreover, the methods, and associated systems and apparatus, described herein are highly transparent to the user, thereby achieving an objective of enhancing the user's experience of a web site employing bot assessment protocols.

Description of an Invention Embodiment

A primary objective of bot creation is to autonomously access data and/or functionality of a target server as quickly as possible. By assessing user biometrics having a time domain, the time variable becomes a necessary component to accessing the data and/or functionality of the server. Because such assessment has heretofore been absent as a valid CAPTCHA marker of a human user, and more importantly because proper data input would necessarily slow the process, the likelihood of bot penetration has been significantly reduced.

An embodiment of the invention employs a first layer of testing that simply checks if there were valid mouse movements and/or key strokes inputted by the user of a computing device that is attempting to access a server resource "protected" from bots. This basic "if-then" check is essentially without overhead since there are no computations being carried out.

Checking for the existence of the target activity therefore represents a first pass evaluation; if the bot is not programmed to include pseudo biometric data, further access is denied. In other words, if no activity is recorded there is a very high probability that the user is actually a bot.

A fundamental premise of robust biometrics is that a given dataset for each person is unique. Therefore, if the dataset is sufficiently robust, it is impossible to have duplicative input data unless the input data was derived from a machine. Exploiting this premise allows a second level knockout assessment to deny user access if the input data exactly (or statistically sufficiently) matches previously recorded data. Of course, the skilled practitioner employing this method can select (either explicitly or via programming) sample points of a dataset for comparison as opposed to all data, thereby reducing computational overhead and storage issues. Alternatively, if samples are used, an exact match could then invoke a more intensive comparison with the same stored datasets, where again access can be denied when an exact or statistically sufficient match is found.

In the foregoing two assessments, an object has been to ferret out bots in an efficient and low overhead manner by exploiting intrinsic design limitations. However, it is possible that a bot designer could spoof these assessment means by, for example, running many bots in parallel wherein intrinsic delays in CPU processing and bandwidth would introduce inherent time delays associated with the very inputs being assessed. Therefore, more robust assessment means may be employed to ascertain the presence of a bot.

In robust embodiments of the invention, a third layer of testing may be employed that compares recorded pointer movements and key strokes to previously recorded activity for a given input page that was knowingly created by humans. Thus, as input data is collected for a given page, patterns will emerge that are unique to human activity. Subsequently recorded activity that is inconsistent with these patterns would indicate the potential that the user is a bot. Access could then be denied, or further CAPTCHA tests presented. Alternatively, access could be granted since no lock is pick proof and an object of the invention embodiments is to minimize user exposure to CAPTCHA tests.

What is claimed is:

1. A non-transitory machine readable medium having stored thereon instructions to perform a method of assessing likelihood of humanity of a user that is controlling a computing device requesting access to a webpage via a server, which when executed by at least one machine, cause the at least one machine to perform operations comprising:

receive passive data from the computing device attempting to access the webpage;

perform a first analysis comprising analyzing at least some of the passive data in conjunction with passive model data;

generate a first analysis value based on the first analysis;

determine whether to allow access to the webpage based at least in part on a first analysis predetermined criteria, wherein:

if the first analysis value meets the first analysis predetermined criteria, then access to the webpage is allowed based on the first analysis value, and if the first analysis value does not meet the first analysis predetermined criteria, then access to the webpage is not allowed based on the first analysis value;

if access to the webpage was not allowed based on the first analysis value, determine whether to allow access to the webpage based at least in part on a second analysis predetermined criteria, wherein:

based on the first analysis value not meeting the first analysis predetermined criteria:

perform a second analysis comprising analyzing at least some active data of the computing device attempting to access the webpage, wherein active data is of a type different than passive data; and generate a second analysis value based on the second analysis;

if the second analysis value meets the second analysis predetermined criteria, then access to the webpage is allowed based on the second analysis value, and if the second analysis value does not meet the second analysis predetermined criteria, then access to the webpage is not allowed based on the second analysis value.

2. A non-transitory machine readable medium as claim 1 recites, wherein the webpage is a protected webpage.

3. A non-transitory machine readable medium as claim 1 recites, further comprising instructions, which when executed by the at least one machine, cause the at least one machine to determine whether to allow access to the webpage isbased at least in part on the first analysis of the first analysis predetermined criteria that takes place before providing any issued data to the computing device responsive to the computing device requesting access to the webpage.

4. A non-transitory machine readable medium as claim 1 recites, further comprising instructions, which when executed by the at least one machine, cause the at least one machine to, responsive to a determination not to allow access to the webpage based at least in part on the first analysis predetermined criteria, generate issued data to be provided to the computing device, wherein the issued data comprises code configured to cause a browser of the computing device to collect the active data.

5. A non-transitory machine-readable medium as claim 1 recites, further comprising instructions, which when executed by the at least one machine, cause the at least one machine to receive active data after generation of issued data to be provided to the computing device responsive to the request to access the webpage.

6. A non-transitory machine readable medium as claim 1 recites, further comprising instructions, which when executed by the at least one machine, cause the at least one machine to facilitate preparation of a CAPTCHA test, wherein when the first analysis value meets the first analysis predetermined criteria, the computing device has not been presented with the CAPTCHA test prior to being granted access to the webpage.

7. A non-transitory machine readable medium as claim 1 recites, wherein:

the passive data comprises at least one of:

at least one browser cookie, or at least one Internet Protocol (IP) address associated with the computing device, and the first analysis further includes analyzing, in conjunction with the passive model data, the at least one of:

the at least one browser cookie, or the at least one IP address.

8. A non-transitory machine readable medium as claim 1 recites, wherein:

the passive data comprises:

at least one browser cookie, and at least one Internet Protocol (IP) address associated with the computing device, and the first analysis further includes analyzing, in conjunction with the passive model data,:

the at least one browser cookie, and the at least one IP address.

9. A non-transitory machine readable medium as claim 1 recites, wherein:

the active data comprises data indicative of at least one of keyboard activity or mouse activity associated with the computing device, and the second analysis further includes analyzing the active data indicative of the at least one of the keyboard activity or the mouse activity in conjunction with theactive model data.

10. A non-transitory machine readable medium as claim 1 recites, wherein:

the active data comprises data indicative of at least one of keyboard activity or mouse activity associated with the webpage, and the second analysis further includes analyzing the active data indicative of the at least one of the keyboard activity or the mouse activity in conjunction with data indicative of a prior interaction with the webpage.

11. A non-transitory machine readable medium as claim 1 recites, wherein the passive data received is encrypted, at least in part, and the operations further comprise decrypting the encrypted passive data.

12. A non-transitory machine readable medium as claim 1 recites, wherein the active data received is encrypted, at least in part, and the operations further comprise decrypting the encrypted active data.

13. A non-transitory machine readable medium as claim 1 recites, wherein the passive model data is based, at least in part, on human interaction from a prior session with the webpage.

14. A non-transitory machine readable medium as claim 1 recites, further comprising instructions, which when executed by the at least one machine, cause the at least one machine to provide data that enables the computing device to collect active data while the computing device is visiting a webpage that enables active data collection.

15. A non-transitory machine readable medium as claim 1 recites, further comprising instructions, which when executed by the at least one machine, cause the at least one machine to allow at least one of the first analysis predetermined criteria or the second analysis predetermined criteria to be received from an operator or an administrator associated with the webpage.

16. A non-transitory machine readable medium as claim 1 recites, further comprising instructions, which when executed by the at least one machine, cause the at least one machine to:

cause at least one CAPTCHA test to be stored; and after the first analysis value not meeting the first analysis predetermined criteria and the second analysis value not meeting the second analysis predetermined criteria, provide the at least one CAPTCHA test to the computing device after the second analysis value fails to meet the second analysis predetermined criteria.

17. A non-transitory machine readable medium as claim 1 recites, wherein the active data analyzed in the second analysis is not related to solving a CAPTCHA test; and wherein the operations further comprise, if the second analysis value does not meet the second analysis predetermined criteria, tofacilitateing a CAPTCHA test.

18. A non-transitory machine readable medium as claim 1 recites, further comprising instructions, when executed by the at least one machine, that cause the at least one machine to, after the first analysis value does not meet the first analysis predetermined criteria, receive the at least some active data from the computing device attempting to access the web page prior to performing the second analysis.

19. A non-transitory machine readable medium as claim 1 recites, further comprising instructions, which when executed by the at least one machine, cause the at least one machine to provide a CAPTCHA test to the computing device, after the first analysis value does not meet the first analysis predetermined criteria and the second analysis value does not meet the second analysis predetermined criteria.

20. A non-transitory machine readable medium as claim 19 recites, further comprising instructions, which when executed by the at least one machine, cause the at least one machine to:

receive active data associated with the CAPTCHA test;

perform a third analysis comprising analyzing at least some of the active data associated with the CAPTCHA test in conjunction with model data associated with CAPTCHA;

generate a third analysis value based on the third analysis;

determine whether to allow access to the webpage based at least in part on a third analysis predetermined criteria, wherein:

if the third analysis value meets the third analysis predetermined criteria, then access to the webpage is allowed, and if the third analysis value does not meet the third analysis predetermined criteria, then access to the webpage is not allowed.

21. A non-transitory machine readable medium as claim 1 recites, wherein:

the active data comprises data indicative of at least one of keyboard activity or mouse activity associated with the computing device and the webpage, and the second analysis further includes analyzing the active data indicative of the at least one of the keyboard activity or the mouse activity in conjunction with active model data.

22. A non-transitory machine readable medium as claim 21 recites, wherein the active model data is based, at least in part, on human interaction from a prior session with the webpage.

23. A method of assessing likelihood of humanity of a user that is controlling a computing device requesting access to a webpage via a server, the method comprising:

receiving passive data from the computing device attempting to access the webpage;

performing a first analysis comprising analyzing at least some of the passive data in conjunction with passive model data;

generating a first analysis value based on the first analysis;

determining whether to allow access to the webpage based at least in part on a first analysis predetermined criteria, wherein:

if the first analysis value meets the first analysis predetermined criteria, then allowing access to the webpage based on the first analysis value, and if the first analysis value does not meet the first analysis predetermined criteria, then not allowing access to the webpage based on the first analysis value;

if access to the webpage was not allowed based on the first analysis value, determining whether to allow access to the webpage based at least in part on a second analysis predetermined criteria, wherein:

based on the first analysis value not meeting the first analysis predetermined criteria:

performing a second analysis comprising analyzing at least some active data of the computing device attempting to access the webpage, wherein active data is of a type different than passive data; and generating a second analysis value based on the second analysis;

if the second analysis value meets the second analysis predetermined criteria, then allowing access to the webpage based on the second analysis value, and if the second analysis value does not meet the second analysis predetermined criteria, then not allowing access to the webpage based on the second analysis value.

24. A method as claim 23 recites, wherein the webpage is a protected webpage.

25. A method as claim 23 recites, wherein determining whether to allow access to the webpage is based at least in part on the first analysis of the first analysis predetermined criteria that takes place before providing any issued data to the computing device responsive to the computing device requesting access to the webpage.

26. A method as claim 23 recites, further comprising, responsive to a determination not to allow access to the webpage based at least in part on the first analysis predetermined criteria, generating issued data to be provided to the computing device, wherein the issued data comprises code configured to cause a browser of the computing device to collect the active data.

27. A method as claim 23 recites, further comprising receiving active data after generation of issued data to be provided to the computing device responsive to the request to access the webpage.

28. A method as claim 23 recites, further comprising facilitating preparation of a CAPTCHA test, wherein when the first analysis value meets the first analysis predetermined criteria, the computing device has not been presented with the CAPTCHA test prior to being granted access to the webpage.

29. A method as claim 23 recites, wherein:

the passive data comprises at least one of:

at least one browser cookie, or at least one Internet Protocol (IP) address associated with the computing device, and the first analysis further includes analyzing, in conjunction with the passive model data, the at least one of:

the at least one browser cookie, or the at least one IP address.

30. A method as claim 23 recites, wherein:

the passive data comprises:

at least one browser cookie, and at least one Internet Protocol (IP) address associated with the computing device, and the first analysis further includes analyzing, in conjunction with the passive model data:

the at least one browser cookie, and the at least one IP address.

31. A method as claim 23 recites, wherein:

the active data comprises data indicative of at least one of keyboard activity or mouse activity associated with the webpage, and the second analysis further includes analyzing the active data indicative of the at least one of the keyboard activity or the mouse activity in conjunction with data indicative of a prior interaction with the webpage.

32. A method as claim 23 recites, wherein:

the active data comprises data indicative of at least one of keyboard activity or mouse activity associated with the computing device and the webpage, and the second analysis further includes analyzing the active data indicative of the at least one of the keyboard activity or the mouse activity in conjunction with active model data.

33. A method as claim 23 recites, wherein the passive data received is encrypted, at least in part, and the method further comprises decrypting the encrypted passive data.

34. A method as claim 23 recites, wherein the active data received is encrypted, at least in part, and the method further comprises decrypting the encrypted active data.

35. A method as claim 23 recites, wherein the passive model data is based, at least in part, on human interaction from a prior session with the webpage.

36. A method as claim 23 recites, further comprising providing data that enables the computing device to collect active data while the computing device is visiting a webpage that enables active data collection.

37. A method as claim 23 recites, further comprising allowing at least one of the first analysis predetermined criteria or the second analysis predetermined criteria to be received from an operator or an administrator associated with the webpage.

38. A method as claim 23 recites, further comprising:

causing at least one CAPTCHA test to be stored; and after the first analysis value does not meet the first analysis predetermined criteria and the second analysis value does not meet the second analysis predetermined criteria, providing the at least one CAPTCHA test to the computing device after the second analysis value fails to meet the second analysis predetermined criteria.

39. A method as claim 23 recites, wherein the active data analyzed in the second analysis is not related to solving a CAPTCHA test; and further comprising, if the second analysis value does not meet the second analysis predetermined criteria, facilitating a CAPTCHA test.

40. A method as claim 23 recites, wherein, after the first analysis value does not meet the first analysis predetermined criteria, receiving the at least some active data from the computing device attempting to access the web page prior to performing the second analysis.

41. A method as claim 23 recites, further comprising providing a CAPTCHA test to the computing device after the first analysis value does not meet the first analysis predetermined criteria and the second analysis value does not meet the second analysis predetermined criteria.

42. A method as claim 41 recites, further comprising:

receiving active data associated with the CAPTCHA test;

performing a third analysis comprising analyzing at least some of the active data associated with the CAPTCHA test in conjunction with model data associated with CAPTCHA;

generating a third analysis value based on the third analysis;

determining whether to allow access to the webpage based at least in part on a third analysis predetermined criteria, wherein:

if the third analysis value meets the third analysis predetermined criteria, then allowing access to the webpage based on the third analysis value, and if the third analysis value does not meet the third analysis predetermined criteria, then not allowing access to the webpage based on the third analysis value.

43. A method as claim 23 recites, wherein:

the active data comprises data indicative of at least one of keyboard activity or mouse activity associated with the computing device, and the second analysis further includes analyzing the active data indicative of the at least one of the keyboard activity or the mouse activity in conjunction with active model data.

44. A method as claim 43 recites, wherein the active model data is based, at least in part, on human interaction from a prior session with the webpage.

\* \* \* \* \*